Aug. 17, 1948.                M. M. WRIGHT                2,447,301
                    CORN REMOVER FOR COOKED SWEET CORN
                          Filed Oct. 30, 1944
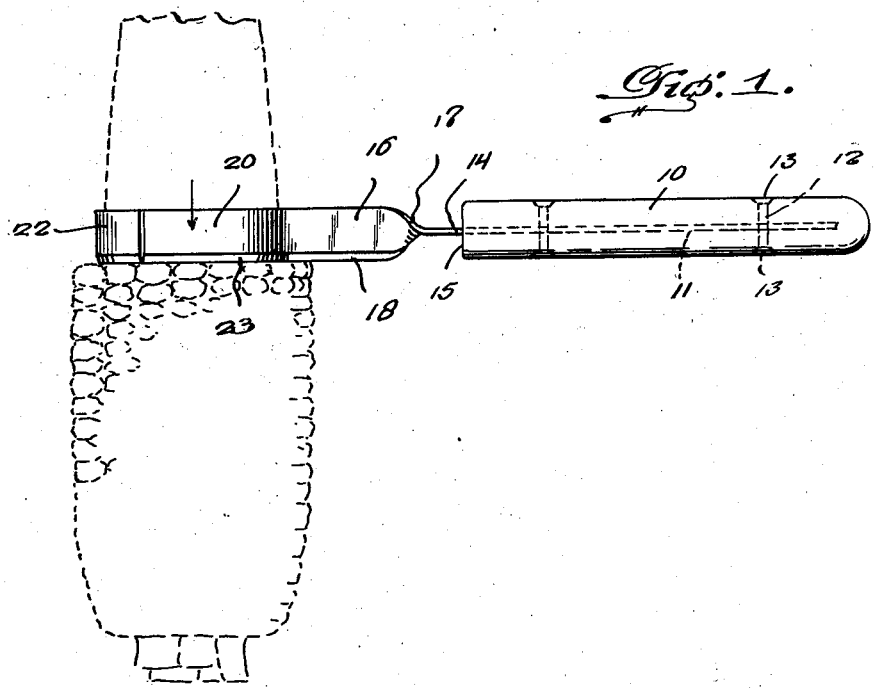
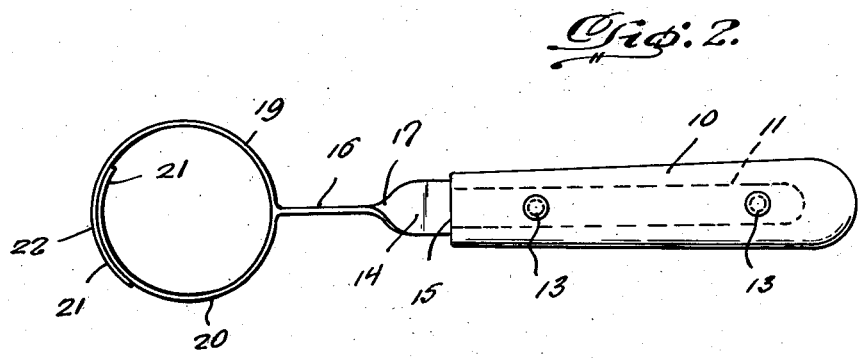
Inventor
Marshall M. Wright, Patented Aug. 17, 1948

2,447,301

UNITED STATES PATENT OFFICE 2,447,301

CORN REMOVER FOR COOKED SWEET CORN

Marshall M. Wright, Pierpont, Ohio

Application October 30, 1944, Serial No. 561,023

1 Claim. (Cl. 30—278)

This invention relates to a corn remover for cooked sweet corn and is designed to provide a simple, efficient inexpensive and ingenious device which may be readily manipulated without special practice or skill and which will protect the operator from the danger of accident and which will provide for the removal of the corn without waste and without removing with the corn objectionable portions of the cob and the tough root portions of the corn kernels.

While the device of the present invention is particularly adapted for use in the removal of corn from the cob it is also designed to have a wide variety of other uses which will recommend it to the housewife as a general utility tool. From a further consideration of the drawings and the following specification, it will be apparent that the device may be used for the paring of many types of fruit and vegetables, particularly such fruit or vegetables as are circular and elongated as for instance cucumbers, squash and the like. With such vegetables or fruit the expandable circular cutting blade is used in the same manner as when applied in the cutting of corn from the cob. The device, however, also includes a straight substantially rigid blade portion which adapts the device for use as a general utility kitchen knife for slicing and paring and the thousandfold other uses to which such knives are put in general culinary pursuits.

From the foregoing, it will be understood that it is one of the primary objects of the invention to provide a general utility kitchen tool which is particularly adapted to safely, quickly and thoroughly remove the desirable portions of corn from the cob.

Another important object of the invention is to provide a device of the character set forth which will automatically accommodate itself to use with ears of corn of widely differing diameters without the necessity of the user making adjustments of the device and without any departure from the characteristic simplicity and clean cutting characteristics of the device.

A still further object of the invention is to provide a kitchen tool of the character set forth which, while being particularly designed for and efficient in the removal of corn from the cob or in the paring of similar elongated cylindrical fruits or vegetables, is also useful as a general utility kitchen knife for paring or slicing and the like.

A still further object of the invention is to provide a device of the character set forth which has unique and advantageous structural features which render it not only susceptible of economic manufacture but of improved durability and strength such that it may have a long life of utility. This object is also accompanied by the provision of a structure which is simple in design and is devoid of intricate configurations which present difficulties in the matter of thoroughly cleaning and sterilizing the tool. Thus the device is one which may be readily maintained in a sanitary condition at all times with a minimum of care.

Numerous other objects and advantages of the present invention will be apparent from a consideration of the following specification taken in conjunction with the accompanying drawings in which:

Figure 1 is a side elevation of my invention showing it in the mid position of operation on an ear of corn; and Figure 2 is a top plan view of the device shown in Figure 1.

Referring now more particularly to the drawings, the device includes a handle 10 in which is embedded a long shank portion 11 of the cutting blade. The handle 10 may be of solid material having an aperture or recess into which the shank 11 is fitted or if desired the handle may be formed of a pair of matching handle sections suitably recessed to receive the shank 11 therebetween. The shank 11 may be secured in the handle 10 in any desired manner but preferably it is secured as illustrated by rivets 12 passing through suitable apertures in the shank 11 and headed over on the outer surfaces of the handle 10 as at 13.

In order to secure a permanent and rigid attachment of the movement of the shank in the handle the shank 11 is of reduced width with respect to the width of the remainder of the blade thus to provide a shoulder 14 which abuts the inner square end 15 of the handle. The engagement of the shoulder surfaces with the end of the handle together with the securement of the shank 11 by the rivets 12 insures at all times a rigid connection which will not deteriorate with use and which prevents the possibility of tilting or twisting of the blade with respect to the handle which would cause inaccuracies in the cutting and the danger of accident to the user.

The blade member extends forwardly from the shoulder 14 to a straight blade portion 16 which is turned as at 17 to give rigidity to the structure. By such turning of the blade the thrust when in operation as in Figure 1 will not cause the edges of the imbedded shank to bear against the thinner portions of the handle 10 and thus the danger of weakening or fracturing the union of the shank and handle is avoided. The lower edge 18 of the straight blade portion 16 is formed into a cutting blade by suitable sharpening as by the "hollow ground" method so as to provide a rigid general utility blade particularly adapted for peeling and slicing and such other operations as are customary in the kitchen during the preparation of meals. The downward thrust on the rigid blade 18 will also be seen to be carried to the handle 10 by the flat portion of the shank 11 and thus will not tend to force the side edges of the shank against the handle body in a manner to cause the handle to split or otherwise fracture.

Forwardly of the rigid blade 16 the blade is divided into a pair of semi-flexible cutting blades 19 and 20. The blades 19 and 20 are each semi-circularly bent, their ends 21 overlapping as at 22. The lower edges 23 of each of the blades 19 and 20 are formed as cutting edges preferably in the manner of the forming of the cutting edge of the rigid blade 16. In the preferred construction here shown the blades 19 and 20 are formed from a division of the material of the blade 16, the material of the blades 19 and 20 however being of substantially the same thickness as that of the blade 16. This construction while not necessary to all forms of the invention provides for a complete circular character of the corn removing blades 19 and 20 which would not be the case if the blades were formed of separate blade members joined together, since at the point of joining a V-shaped configuration would be present and the corn adjacent such V would not be fully and cleanly removed.

In the operation of the present device for normal slicing and paring operations or the like the rigid blade 16 is used in the usual manner of use of a simple kitchen paring knife. The right angular relation of the blade edge with respect to the flat of the handle insures a minimum of wearing between the shank and the handle. When the device is to be used for the removal of cooked sweet corn from the cob the corn is held in a vertical position as shown in Figure 1. The operator preferably holds the corn at the lower portion of the cob and grasping the cutter by the handle the circular semi-flexible blades 19 and 20 are positioned to encircle the cob with the cutting edges thereof lowermost as shown in Figure 1. A downward pressure on the handle 10 thus forces the cutting edges into the kernels of corn at their roots and in snug proximity to the cob. The semi-flexibility and overlapping character of the blades 19 and 20 permits the blades to closely embrace the cob and to compensate not only for various thicknesses of different cobs but for differences of diameter of the cob from end to end. Thus when a larger cob is used or when the cutting edges have reached a wider portion of the cob the edges will expand to compensate for such extra width; however, since the ends 21 overlap, such expansion will not cause a separation of the member 19 from the member 20 and thus there will be no gap in the cutting operation of the blades.

After the mid point of the cob has been reached by the blades, it is preferable that the operator shift the holding hand to the top portion of the cob from which the corn has already been removed. The blades may then be forced downwardly to the lowermost end of the cob and the corn will then have been cleanly cut from the entire cob. The flexibility of the blades will insure a snug cutting action so as to insure the removal of all the desirable portions of the kernels without cutting into the cob or removing the undesirable tough root portions. It will of course be understood that the flexibility will cause the blades to conform to the diminishing diameter of the cob at the lower end as well as the increasing thickness encountered in passing down from the tapered top of the cob.

It is understood that the invention is not limited to all of the structural features here shown by way of illustration and that numerous changes, modifications, substitutions and the full use of equivalents may be resorted to in carrying out the invention without departure from the spirit or scope of the invention as outlined in the appended claim.

What I claim is:

A corn cutter comprising a circularly shaped cutting blade having resiliently overlapping ends, and a handle integral with the cutting blade and extending radially therefrom at a point substantially opposite the overlapping ends, the said handle being bent at right angles to the cutting blade.

MARSHALL M. WRIGHT.

REFERENCES CITED

The following references are of record in the file of this patent:

UNITED STATES PATENTS

| Number | Name | Date |
| --- | --- | --- |
| 53,849 | McGill | Apr. 10, 1866 |
| 903,056 | Clift | Nov. 3, 1908 |
| 1,386,956 | Sanders | Aug. 9, 1921 |
| 2,032,562 | Burns | Mar. 3, 1936 |
| 2,188,020 | Tewell | Jan. 23, 1940 |
| 2,297,565 | Kors | Sept. 9, 1942 |
| 2,300,671 | Howard | Nov. 3, 1942 |